(12) United States Patent
Ozeki et al.

(10) Patent No.: US 9,507,193 B2
(45) Date of Patent: Nov. 29, 2016

(54) DISPLAY DEVICE AND TELEVISION DEVICE

(71) Applicant: Sharp Kabushiki Kaisha, Osaka-shi, Osaka (JP)

(72) Inventors: Tsuyoshi Ozeki, Osaka (JP); Kazuya Kondoh, Osaka (JP); Mamoru Ohashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 31 days.

(21) Appl. No.: 14/419,314

(22) PCT Filed: Aug. 21, 2013

(86) PCT No.: PCT/JP2013/072277
§ 371 (c)(1),
(2) Date: Feb. 3, 2015

(87) PCT Pub. No.: WO2014/034485
PCT Pub. Date: Mar. 6, 2014

(65) Prior Publication Data
US 2015/0185540 A1  Jul. 2, 2015

(30) Foreign Application Priority Data

Aug. 28, 2012 (JP) ................................. 2012-187711

(51) Int. Cl.
*G02F 1/1333* (2006.01)
*F21V 8/00* (2006.01)
(Continued)

(52) U.S. Cl.
CPC ....... *G02F 1/133308* (2013.01); *G02B 6/0088* (2013.01); *H04N 5/64* (2013.01); *G02F 1/133615* (2013.01); *G02F 2001/133317* (2013.01)

(58) Field of Classification Search
CPC .................. G02F 1/133308; G02F 1/133615; G02F 2001/133317; G02B 6/0088; G02B 6/0086; G02B 6/0091; G02B 6/0081; G02B 6/0011; H04N 5/64; F21V 2200/20; F21V 19/00; F21V 19/001
See application file for complete search history.

(56) References Cited

U.S. PATENT DOCUMENTS 7,742,121 B2 * 6/2010 Mori .................... G02B 6/0021
349/58
7,798,701 B2    9/2010 Mori et al.
(Continued)

FOREIGN PATENT DOCUMENTS

JP     2007-042338 A    2/2007
JP     2009-003081 A    1/2009
(Continued)

OTHER PUBLICATIONS

Official Communication issued in International Patent Application No. PCT/JP2013/072277, mailed on Oct. 15, 2013.

*Primary Examiner* — Bao Q Truong
(74) *Attorney, Agent, or Firm* — Keating & Bennett, LLP

(57) ABSTRACT

A liquid crystal display device 10 includes an LED unit 30, a liquid crystal panel 11, a light guide plate 16, a chassis 14, and a frame 13. The LED unit 30 includes an LED 17 and an LED board 18. The light guide plate 16 arranged such that a light entrance surface 16b faces the LED 17. The frame 13 is fixed to the chassis 14. The frame 13 and the chassis 14 hold the liquid crystal panel 11 and the light guide plate 16 therebetween. The frame 13 includes a panel holding portion 13a and a sidewall portion 13b. The panel holding portion 13a holds the liquid crystal panel 11 from the display surface 11a side. The sidewall portion 13b continues from the panel holding portion 13a and extends on the light entrance surface 16b side. The frame 13a includes a through hole 40 that runs through the sidewall portion 13a. The LED unit 30 is fitted in the through hole 40 from the outer side such that the LED 17 is positioned more to the inner side than the sidewall portion 13b and at least a portion of the LED unit 30 is held inside the through hole 40.

11 Claims, 9 Drawing Sheets

(51) Int. Cl.
*H04N 5/64* (2006.01)
*G02F 1/1335* (2006.01)

(56) References Cited

U.S. PATENT DOCUMENTS

| 8,147,113 | B2* | 4/2012 | Hamada | G02B 6/0085 |
| | | | | 362/218 |
| 8,267,569 | B2* | 9/2012 | Hamada | G02B 6/0085 |
| | | | | 362/612 |
| 2008/0316771 | A1 | 12/2008 | Mori et al. | |
| 2010/0073959 | A1 | 3/2010 | Hamada | |
| 2012/0105762 | A1* | 5/2012 | Que | G02F 1/133615 |
| | | | | 349/60 |
| 2012/0133290 | A1 | 5/2012 | Hasegawa | |
| 2013/0100699 | A1* | 4/2013 | Chen | G02F 1/133615 |
| | | | | 362/611 |

FOREIGN PATENT DOCUMENTS

| JP | 2010-122330 A | 6/2010 |
| JP | 2012-113152 A | 6/2012 |
| WO | 2008/090646 A1 | 7/2008 |

\* cited by examiner

DISPLAY DEVICE AND TELEVISION DEVICE

TECHNICAL FIELD

The present invention relates to a display device and a television device.

BACKGROUND ART

Display components in image display devices, such as television devices, are now being shifted from conventional cathode-ray tube displays to thin display panels, such as liquid crystal panels and plasma display panels. With the thin display panels, the thicknesses of the image display devices can be reduced. Liquid crystal panels included in the liquid crystal display devices do not emit light, and thus backlight devices are required as separate lighting devices. The backlight devices are generally classified into direct-type and edge-light-type according to mechanisms. To further reduce the thicknesses of the liquid crystal display devices, the edge-light-type backlight devices are more preferable. An example of such a device is disclosed in Patent Document 1.

The display device disclosed in Patent Document 1 includes a rear frame (a chassis) and a front frame (a frame member) each including sidewalls that have openings. The sidewalls are substantially perpendicular to sidewalls of the rear frame and the front frame closer to light source boards. When the light source boards (light source units) need to be removed or replaced, screws that fix the light source boards are removed and the light source boards are accessed through the openings, slid along an inner surface of the rear frame, and removed, and new boards are inserted through the openings. With this configuration, removal and replacement of the light source boards can be easily performed. To fix the light source boards, the screws are inserted in holes of the front frame and the rear frame and the light source boards are screwed from the rear side. According to such a configuration, the light source boards are properly, tightly, and closely fixed to the inner surface of the rear frame.

RELATED ART DOCUMENT

Patent Document

Patent Document 1: Japanese Unexamined Patent Application Publication No. 2009-3081

Problem to be Solved by the Invention

In Patent Document 1, sidewalls that are closer to light source units do not have openings but sidewalls that are substantially perpendicular to the sidewalls that are closer to the light source units have openings. Namely, the openings are formed in portions other than portions in which the light source units are arranged. Therefore, when the light source units are mounted, light may leak through the openings or dust or foreign substances may enter through the holes, which may cause problems.

In recent years, there are demands for reducing in frame size of display devices. In Patent Document 1, the light source units are in close contact with the inner surfaces of the sidewalls. When each light source unit is mounted to the corresponding sidewall, a minimum size is equal to a sum of the thickness of the light source unit and the thickness of the sidewall. Therefore, the minimum size of the sidewall and the light source unit mounted thereto needs to be further reduced to reduce the frame size of the display device.

DISCLOSURE OF THE PRESENT INVENTION

The present invention was made in view of the above circumstances. An object of the technology described herein is to provide a display device having a configuration to improve workability during replacement or reworking of light source units and to reduce a frame size of the display device.

Means for Solving the Problem

A display device according to the present invention includes a light source, a light source unit, a display panel, a light guide plate, a chassis, and a frame member. The light source unit includes a light source board on which the light source is mounted. The display panel is configured to display images using light from the light source. The light guide plate is arranged on an opposite side of the display panel from a display surface so as to overlap the display panel and has an end surface arranged opposite the light source. The chassis is arranged on an opposite side of the light guide plate from the display panel. The frame member is fixed to the chassis and holds at least the display panel and the light guide plate between the frame member and the chassis. The frame member includes a panel holding portion and a sidewall portion. The panel holding portion holds the display panel from a display surface side. The sidewall portion continues from the panel holding portion and extends on an end surface side of the light guide plate. The sidewall portion includes a through hole that runs through the sidewall portion and in which the light source unit is fitted from an outer side such that the light source is positioned more to an inner side than the sidewall portion. At least a portion of the light source unit is held inside the through hole.

According to the display device, the frame member includes the through hole in which the light source unit is fitted from the outer side such that the light source is positioned more to the inner side than the sidewall portion. Therefore, the light source unit is fitted in the through hole while the chassis and the frame remain fixed together. During replacement or reworking of the light source unit, removal or mounting of the light source unit can be performed while the chassis and the frame remain fixed together.

According to the display device, at least a portion of the light source unit is held inside the through hole. In comparison to a configuration in which the light source unit is not held inside the sidewall portion, a dimension measuring when the light source unit is mounted to the sidewall portion can be reduced. This contributes to a reduction in frame size of the display device.

Preferable embodiments may include the following configurations.

(1) The light source board may be held inside the through hole. In comparison to a configuration in which the light source board is not held inside the through hole, this configuration further contributes to the reduction in frame size of the display device.

(2) The light source unit may include a heat dissipation plate arranged on an opposite surface of the light source board from a surface on which the light source is mounted. The light source board and the heat dissipation plate are held inside the through hole. According to this configuration, heat is effectively transmitted to the frame member via the heat dissipation plate and to the chassis via the frame member. The heat produced by the light source is efficiently dissipated. Furthermore, the light source board and the heat dissipation plate are held in the sidewall portion. In comparison to a configuration in which the light source board and the heat dissipation plate are not held inside the through hole, this configuration further contributes to the reduction in the frame size of the display device.

(3) The through hole may have a shape and a size substantially the same as those of the light source unit in a plan view. According to this configuration, the through hole is filled with the light source unit. Therefore, leaks of light through the through hole and entrance of foreign substances through the through hole are less likely to occur.

(4) The display device may further include a covering member arranged on an opposite side of the light source unit from the surface on which the light source is mounted and covering the light source unit. According to this configuration, although the frame member is a component to form an appearance of the liquid crystal display device, it restricts a user from directly touching the light source unit. Even if temperatures of the light source unit become high, a high level of safety is provided.

(5) A positioning projection may be provided in the through hole. The positioning projection may be configured to contact an inner surface of the light source unit and to restrict the light source unit from moving to the inner side. According to this configuration, positioning of the light source unit fitted in the through hole from the outer side can be easily performed.

The light source unit may include a recess in an outer surface of the light source unit. The covering member may include a protrusion fitted in the recess and is attached to the sidewall portion. According to this configuration, the light source unit is mounted to the sidewall portion by attaching the covering member to the sidewall portion with the positioning projection and the covering member.

(7) A plurality of light sources may be mounted on the light source board. The sidewall portion may include the through hole in a portion that overlaps the light source. The light source may be held inside the through hole. According to this configuration, in comparison to a configuration in which a large through hole is provided for holding the entire light source board, the sidewall portion has higher strength.

(8) The light source may be a light emitting diode. According to this configuration, light emitted by the light emitting diode having high directivity is less likely to travel toward the inner wall of the through hole and thus the amount of light absorbed by the inner wall of the through hole can be reduced.

(9) The display panel may be a liquid crystal display panel including liquid crystals. Such a display device, that is, the liquid crystal display device can be applied to various devices including television devices and displays for personal computers. The liquid crystal display device is especially suitable for large screen applications.

Advantageous Effect of the Invention

According to the present invention, workability in replacement or reworking of the light source unit improves and a display device with frame in a reduced size can be provided.

MODE FOR CARRYING OUT THE INVENTION

First Embodiment

Figure 1:
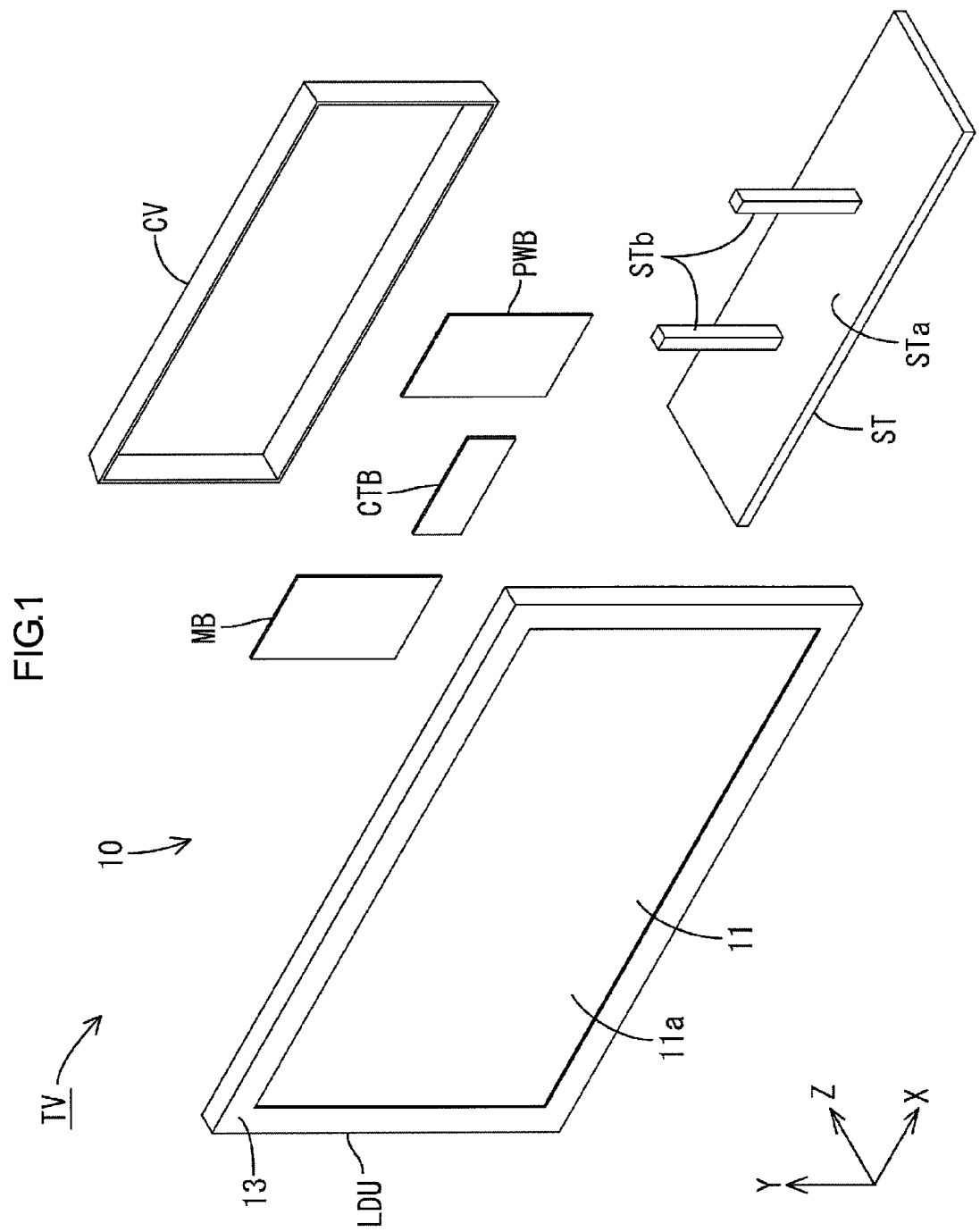
FIG. 1 is an exploded perspective view of a television device TV according to a first embodiment.
Figure 2:
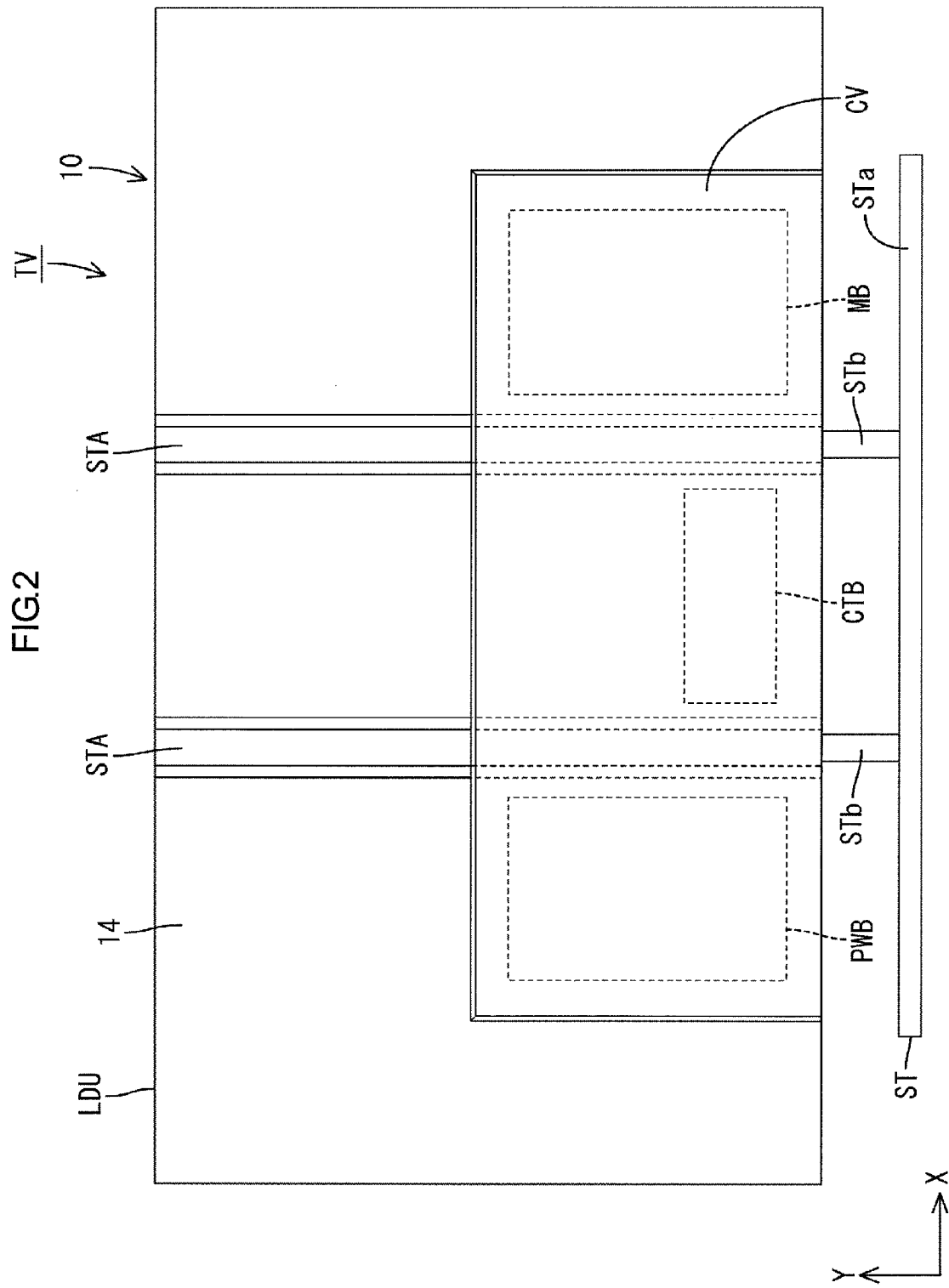
FIG. 2 is a rear view of the television device TV and a liquid crystal display device 10.
Figure 3:
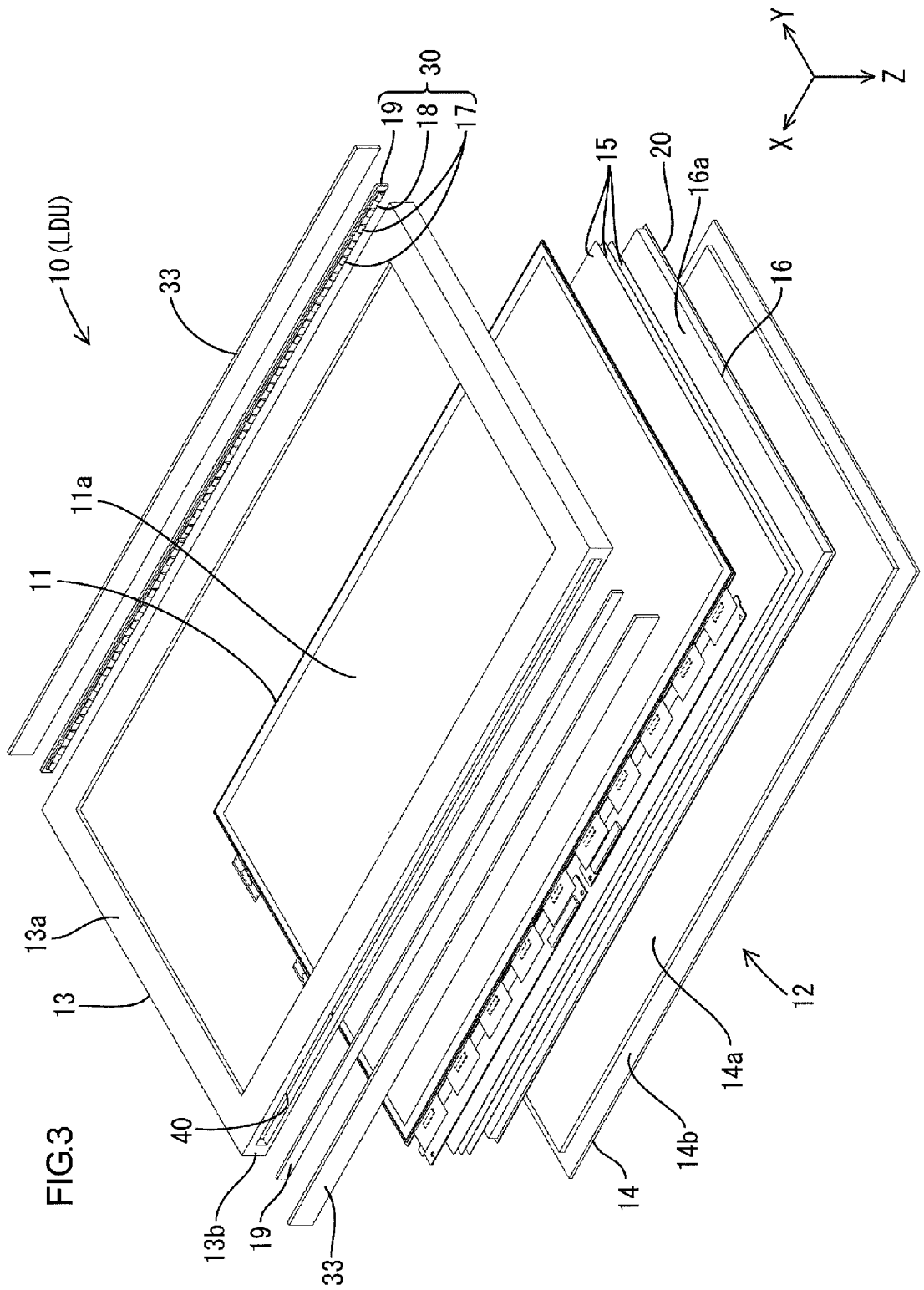
FIG. 3 is an exploded perspective view of the liquid crystal display device 10.
Figure 4:
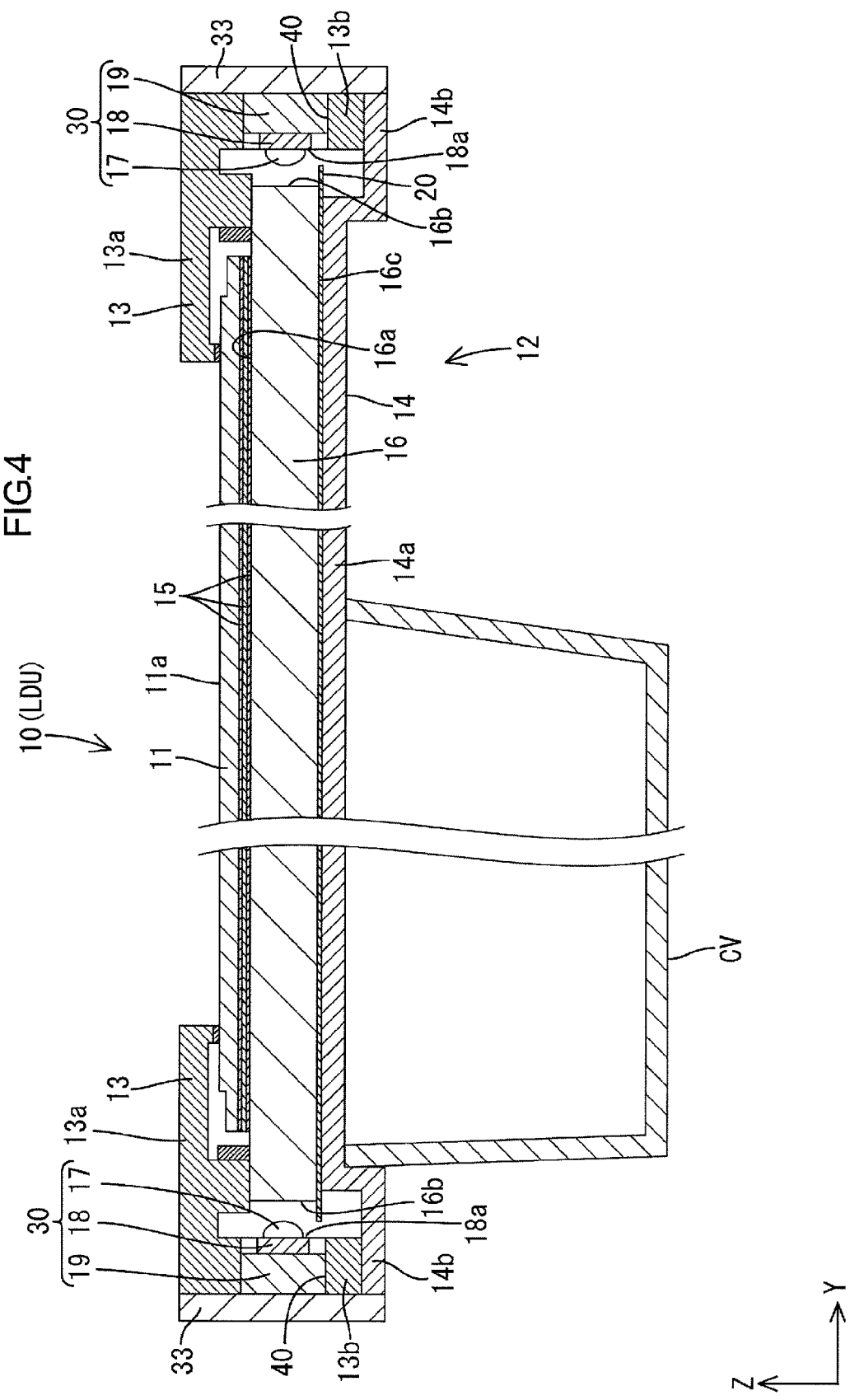
FIG. 4 is a cross-sectional view of the liquid crystal display device 10 taken along a short-side direction thereof.

A first embodiment will be described with reference to the drawings. FIG. 1 is an exploded perspective view of a television device TV according to a first embodiment. FIG. 2 is a rear view of the television device TV and a liquid crystal display device 10. FIG. 3 is an exploded perspective view of the liquid crystal display unit of the liquid crystal display device 10. FIG. 4 is a cross-sectional view of the liquid crystal display device 10 taken along a short-side direction thereof. An X axis, a Y axis, and a Z axis are present in each drawing. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

A television device TV includes a liquid crystal display unit LDU, boards PWB, MB, and CTB, a cover CV, and a stand ST. The boards PWB, MB, and CTB are attached to a rear surface (aback surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the vertical direction (the Y-axis direction). The liquid crystal display device 10 according to this embodiment has the same configuration as the above-described television device TV except for at least a component for receiving television signals (e.g. a tuner included in a main board MB). As illustrated in FIG. 3, the liquid crystal display unit LDU has a horizontally-long rectangular overall shape (rectangular and longitudinal). The liquid crystal display unit LDU includes a liquid crystal panel 11, which is a display oanel, and a backlight device 12, which is an external light source. The liquid crystal panel 11 and the backlight device 12 are collectively held by a frame 13 and a chassis 14. The frame 13 and the chassis 14 are external members that form an external appearance of the liquid crystal display device 10. The chassis 14 in this embodiment is one of the components to form the external appearance and a part of the backlight device 12.

Configurations of the liquid crystal display device 10 on a rear surface side will be described. As illustrated in FIG. 2, stand fitting members STA are attached to a rear surface of the chassis 14 that forms the rear external appearance of the liquid crystal display device 10. The stand fitting members STA are spaced away from each other in an X-axis direction and extend along the Y-axis direction. Each stand fitting member STA has a channel beam-like cross section that opens to the chassis 14. A space is provided between the stand fitting member STA and the chassis 14. Support portions STb included in the stand ST are inserted in the respective stand fitting members STA. The space provided in the stand fitting member STA is configured to be a path through which wiring members (e.g. electric wires) which are connected to an LED board 18 are passed. The LED board 18 is included in the backlight device 12. The stand ST includes abase STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, the boards PWB, MB, and CTB include a power board PWB, a main board MB, and a control board CTB. The power board PWB is a power source of the liquid crystal display device 10 and configured to supply drive power to the other boards MB and CTB and LEDs 17 included in the backlight device 12. Namely, the power board PWB also serves as "an LED drive board that drives the LEDs 17". The main board MB includes at least a tuner and an image processor (both of them are not illustrated). The tuner is configured to receive television signals. The image processor performs image processing on the received television signals. The main board MB is configured to output the processed image signals to the control board CTB. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

As illustrated in FIG. 3, components of the liquid crystal display unit LDU included in the liquid crystal display device 10 are arranged in a space provided between the frame 13 that provides a front external configuration and the chassis 14 that forms a rear external appearance. The components arranged between the frame 13 and the chassis 14 include at least the liquid crystal panel 11, an optical member 15, a light guide plate 16, and LED units 30 (light source units). The liquid crystal panel 11, the optical member 15, and the light guide plate 16 are placed on top of one another and held between the frame 13 on the front side and the chassis 14 on the rear side. The backlight device 12 includes the optical member 15, the light guide plate 16, the LED units 30, and the chassis 14. Namely, the backlight device 12 corresponds to the liquid crystal display unit LDU without the liquid crystal panel 11 and the frame 13. Two LED units 30 included in the backlight device 12 are arranged so as to sandwich the light guide plate 16 in the short-side direction of the light guide plate 16 (in the Y-axis direction). Each LED unit 30 includes LEDs 17 as light sources, the LED board 18, and a heat dissipation plate 19. The LEDs 17 are mounted on the LED board 18. The LED board 18 is attached to the heat dissipation plate 19. Each component will be described next.

As illustrated in FIG. 3, the liquid crystal panel 11 has a horizontally-long rectangular shape (rectangular and longitudinal) in a plan view and includes a pair of glass substrates and liquid crystals. The substrates and having high light transmissivity are bonded together with a predetermined gap therebetween. The liquid crystals are sealed between the substrates. On one of the substrates (an array board), switching elements (e.g. TFTs), pixel electrodes, and an alignment film are arranged. The switching elements are connected to gate lines and source lines that are arranged perpendicular to each other. The pixel electrodes are connected to the switching elements. On the other one of the substrates (a CF board), color filters, a counter electrode, and an alignment film are arranged. The color filters include red (R), green (G), and blue (B) color portions that are arranged in a predetermined arrangement. The liquid crystal panel 11 is placed on a front side of the optical member 15, which will be described later. A rear-side surface of the liquid crystal panel 11 (an outer-side surface of a polarizing plate on the rear side) is fitted to the optical member 15 with minimal gaps therebetween. Therefore, dust is less likely to enter between the liquid crystal panel 11 and the optical member 15. The liquid crustal panel 11 includes a display surface 11a. The display surface 11a includes a display area and a non-display area. The display area is an inner area of a screen in which images are displayed. The non-display area is an outer area of the screen around the display area with a frame-like shape. The liquid crystal panel 11 is connected to the control board CTB via a driver for driving the liquid crystals and flexible boards. The liquid crustal panel 11 displays images in the display area of the display surface 11a based on signals sent from the control board CTB. The polarizing plates are arranged on outer sides of the substrates.

As illustrated in FIG. 3, similar to the liquid crystal panel 11, the optical member 15 has a horizontally-long rectangular shape in a plan view and has the same size (i.e., a short-side dimension and a long-side dimension) as the liquid crystal panel 11. The optical member 15 is placed on the front side of the light guide plate 16 (a light exit side), which will be described later, and sandwiched between the liquid crystal panel 11 and the light guide plate 16. The optical member 15 includes three sheets that are placed on top of one another. Examples of the sheets include a diffuser sheet, a lens sheet, and a reflecting type polarizing sheet. The sheets may be selected from those as appropriate.

The light guide plate 16 is made of substantially transparent (high transmissivity) synthetic resin (e.g. acrylic resin or polycarbonate such as PMMA) which has a refractive index sufficiently higher than that of the air. As illustrated in FIG. 3, the light guide plate 16 has a horizontally-long rectangular shape in a plan view similar to the liquid crystal panel 11 and the optical member 15. A thickness of the light guide plate 16 is larger than a thickness of the optical member 15. A long-side direction and a short-side direction of a main surface of the light guide plate 16 correspond to the X-axis direction and the Y-axis direction, respectively. A thickness direction of the light guide plate 16 that is perpendicular to the main surface of the light guide plate 16 corresponds to the Z-axis direction. The light guide plate 16 is arranged on the rear side of the optical member 15 and sandwiched between the optical member 15 and the chassis 14. As illustrated in FIG. 4, at least a short-side dimension of the light guide plate 16 is larger than short-side dimensions of the liquid crystal panel 11 and the optical member 15. The light guide plate 16 is arranged such that ends of the short dimension thereof (i.e., ends along a long-side direction of the light guide plate 16) protrude over ends of the liquid crystal panel 11 and the optical member 15 (so as not to overlap in a plan view). The LED units 30 are arranged on sides of the short dimension of the light guide plate 16 so as to have the light guide plate 16 between the LED units 30 in the Y-axis direction. Light from the LEDs 17 enters the light guide plate 16 through the ends of the short dimension of the light guide plate 16. The light guide plate 16 is configured to transmit the light, which is from the LEDs 17 and enters the light guide plate 16 through the ends of the short dimension, therethrough and guide toward the optical member 15 (to the front side).

One of the main surfaces of the light guide plate 16 facing the front side (a surface opposite the optical member 15) is a light exit surface 16a. Light exits the light guide plate 16 through the light exit surface 16a toward the optical member 15 and the liquid crystal panel 11. The light guide plate 16 includes outer peripheral end surfaces that are adjacent to the main surfaces of the light guide plate 16, and long-side end surfaces (at ends of the short dimension) which have elongated shapes along the X-axis direction are opposite the LEDs 17 (the LED boards 18). A predetermined space is provided between each long-side end and the LEDs 17 (the LED boards 18). The long-side end surfaces are light entrance surfaces 16b through each of which light from LEDs 17 enters. The light entrance surfaces 16b are parallel to each other along the X-Z plane (or the main surfaces of the LED boards 18) and substantially perpendicular to the light exit surface 16a. An arrangement direction of the LEDs 17 and the light entrance surface 16b corresponds to the Y-axis direction and parallel to the light exit surface 16a.

As illustrated in FIG. 4, a reflection sheet 20 is arranged on the rear side of the light guide plate 16, i.e., on an opposite surface 16c that is opposite from the light exit surface 16a (a surface opposite the chassis 14). The reflection sheet 20 is configured to reflect the light that exits from the opposite surface 16c to the rear side toward the front side. The reflection sheet 20 is arranged to cover an entire area of the opposite surface 16c. The reflection sheet 20 is arranged so as to be sandwiched between the chassis 14 and the light guide plate 16. The reflection sheet 20 is made of synthetic resin and has a white surface having high light reflectivity. A short-side dimension of the reflection sheet 20 is larger than that of the light guide plate 16. The reflection sheet 20 is arranged such that ends of the short dimension thereof protrude closer to the LEDs 17 compared to the light entrance surfaces 16b of the light guide plate 16. Light that travels at an angle from the LEDs 17 toward the chassis 14 is effectively reflected toward the light entrance surfaces 16b of the light guide plate 16 by the protruded portions of the reflection sheet 20. At least one of the light exit surface 16a and the opposite surface 16c of the light guide plate 16 includes a reflecting portion (not illustrated) or a scattering portion (not illustrated). The reflecting portion reflects light inside the light guide plate 16. The scattering portion scatters light inside the light guide plate 16. Each of the reflecting portion and the scattering portion is patterned so as to have predetermined in-plane distribution so that the light that exits from the light exit surface 16a is controlled to have uniform distribution within the surface.

Next, configurations of each of the LEDs 17, the LED boards 18, and the heat dissipation plates 19 included in the LED units 30 will be described. As illustrated in FIGS. 3 and 4, the LED 17 included in the LED unit 30 has a configuration in which each LED chip fixed on the LED board 18 is sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting surface that is opposite from a mounting surface mounted to the LED board 18 (an opposed surface opposite the light entrance surfaces 16b of the light guide plate 16). Namely, the LED 17 is a so-called top-surface-emitting type LED.

As illustrated in FIGS. 3 and 4, each LED board 18 included in each LED unit 30 has an elongated plate-like shape that extends in the long-side direction of the light guide plate 16 (the X-axis direction, the long-side direction of the light entrance surface 16b). The LED boards 18 are arranged such that a plate surface of each LED board 18 is parallel to the X-Z plane, that is, parallel to the light entrance surface 16b of the light guide plate 16. An inner plate surface of the LED board 18 opposite the light guide plate 16 (an opposed surface to the light guide plate 16) is a mount surface 18a on which the LEDs 17 having the above configuration are surface mounted. The LEDs 17 are arranged in line (or linearly) on the mount surface 18a of the LED board 18 at predetermined intervals along the longitudinal direction thereof (the X-axis direction). Namely, multiple LEDs 17 are arranged at intervals along the long-side direction of the backlight device 12 in long edge portions of the backlight device 12, respectively. Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). A Metal-film trace (not illustrated), such as copper-foil trace, is formed on the mount surface 18a of the LED board 18. The metal-film trace extends in the X-axis direction and crosses over a group of the LEDs 17 so as to connect the adjacent LEDs 17 in series. Terminals at ends of the trace are electrically connected to the power board PWB via wiring members including connectors and electric wires. Thus, driving power is supplied to the LEDs 17. The LED boards 18 that sandwich the light guide plate 16 are held inside the frame 13 and the chassis 14 such that the mount surfaces 18a of the LED boards 19 on which the LEDs 17 are mounted are opposed to each other. Therefore, the main light emitting surfaces of the LEDs 17 mounted on one of the LED boards 18 are opposed to the main light emitting surfaces of the LEDs 17 mounted on the other LED board 18. Furthermore, light axes of the LEDs 17 extend substantially in the Y-axis direction. Base members of the LED boards 18 are made of metal, for example, aluminum. The traces that are described earlier (not illustrated) are formed on the surfaces of the base members via insulating layers. The material used for the base members of the LED boards 18 may be insulating material such as ceramic.

The heat dissipation plate 19 included in each LED unit 30 is made of metal having high thermal conductivity, such as aluminum. As illustrated in FIGS. 3 and 4, the heat dissipation plate 19 has a rectangular column-like shape and includes an LED mount surface 19a on which the LED board 18 is mounted. The mount surface 19a is an inner surface opposite the light guide plate 16. The LED mount surface 19a is parallel to the plate surface of the LED board 18 and the light entrance surface 16b of the light guide plate 16. A long-side direction and a short-side direction of the LED mount surface 19a correspond to the X-axis direction and the Y-axis direction, respectively. The long dimension of the LED mount surface 19a is substantially equal to the long dimension of the LED board 18 but the short dimension of the LED mount surface 19a is larger than the short dimension of the LED board 18. Ends of the short dimension of the LED mount portion 19a project outward over the ends of the LED board 18 in the Z-axis direction. The heat dissipation plates 19 are covered with covering members 33, respectively, from the outer sides.

Covering members 33 are made of synthetic resin having lower thermal conductivity than that of the heat dissipation plates 19. As illustrated in FIGS. 3 and 4, each covering member 33 has a plate-like shape that is a rectangular in a plan view. A dimension of the covering member 33 measuring in the X-axis direction is the same as a dimension of a sidewall portion 13b that forms a long-side portion of the frame 13. A dimension of the covering member 33 measuring in the Z-axis direction is equal to a sum of the dimension of the sidewall and a thickness of the chassis 14. The covering member 33 collectively covers surfaces of the frame 13 and the chassis 14 at the short dimension thereof (the X-axis direction) from the outer side. The covering member 33 forms a top surface and a bottom surface of the liquid crystal display device 10. The covering members 33 are mounted to the sidewall portion 13b of the frame 13. Examples of mounting method include a method using adhesive layers, which are not illustrated, and a method using screws, which are not illustrated.

Next, configurations of the frame 13 and the chassis 14 that are members to form the exterior appearance and holding members will be described. The frame 13 and the chassis 14 are made of metal such as aluminum. In comparison to synthetic resin, the mechanical strength (rigidity) and thermal conductivity are higher. The frame 13 and the chassis 14 hold the liquid crystal panel 11, the optical member 15, and the light guide plate 16, which are placed on top of the other, from the front side and the rear side, respectively.

Figure 5:
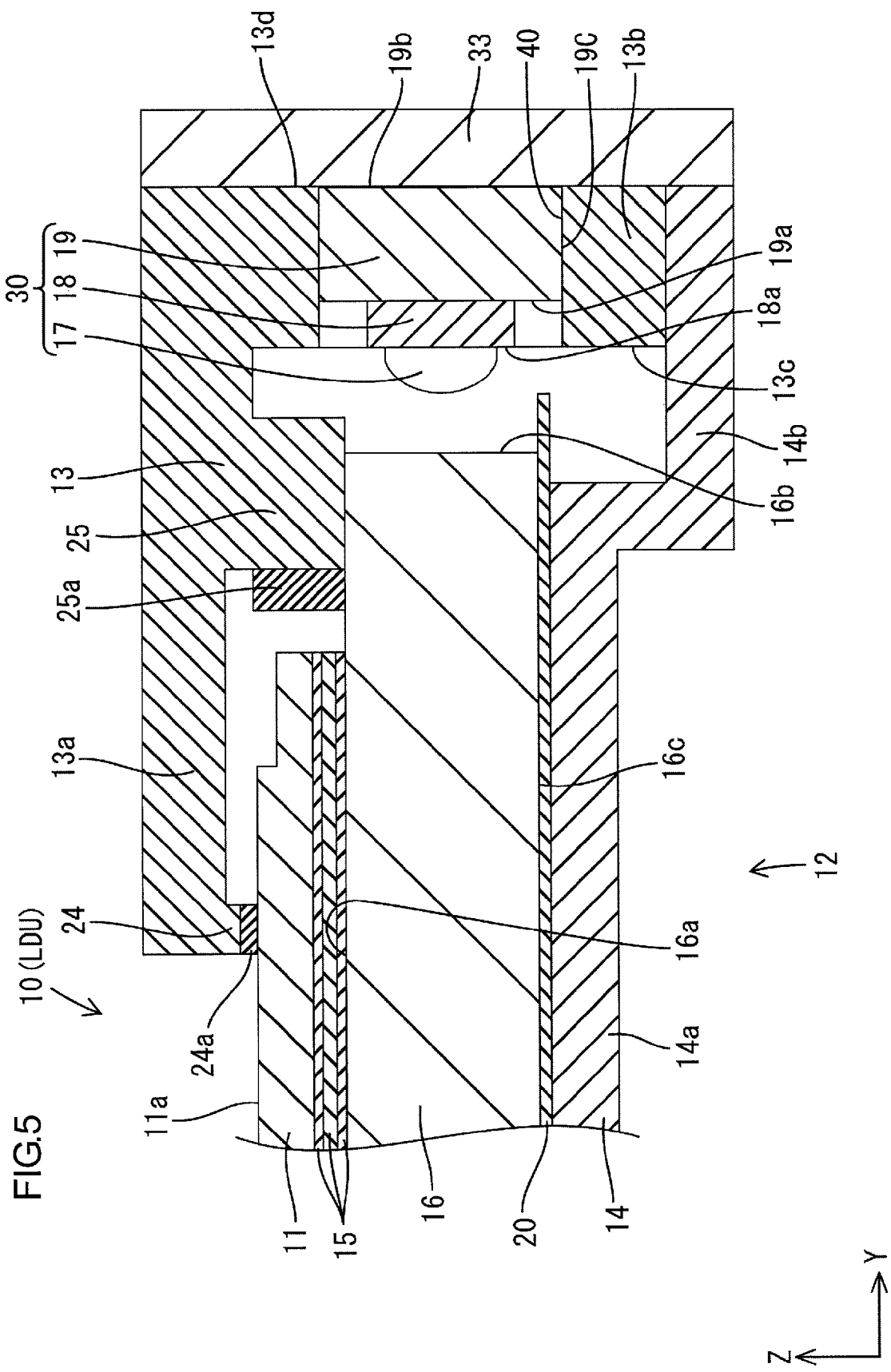
FIG. 5 is a cross-sectional view of a relevant portion of the liquid crystal display device 10.
Figure 6:
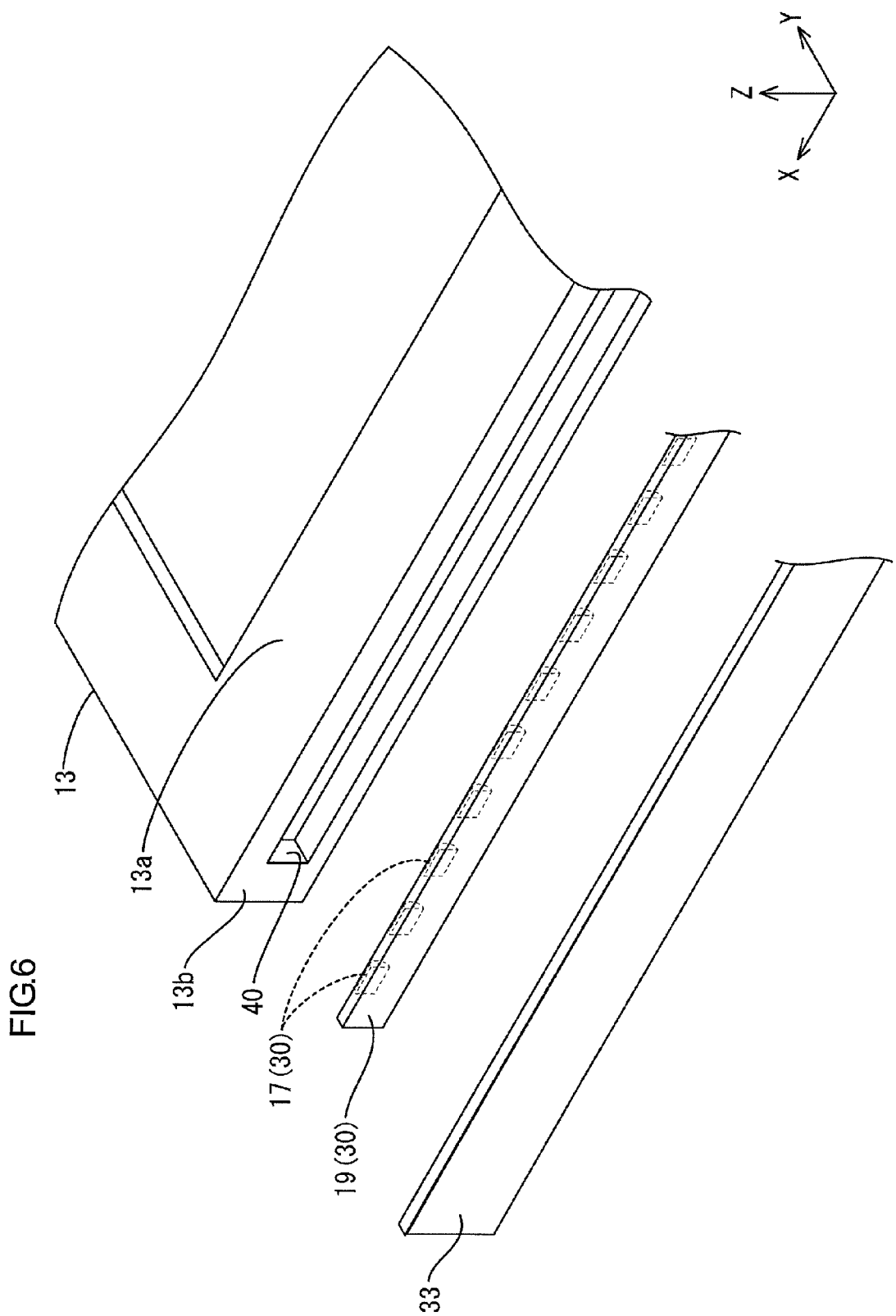
FIG. 6 is a cross-sectional view of a relevant portion of the liquid crystal display device 10 illustrating how to assemble components.

As illustrated in FIG. 3, the frame 13 has a horizontally-long rectangular frame-like overall shape that surrounds the display area of the display surface 11c of the liquid crystal panel 11. The frame 13 includes a panel holding portion 13a and the sidewall portion 13b. The panel holding portion 13a is parallel to the display surface 11c of the liquid crystal panel 11 and holds the liquid crystal panel 11 from the front side. The sidewall portion 13b continues from the panel holding portion 13a and extends on the light entrance surface 12b side of the light guide plate 16 (toward the rear side). The panel holding portion 13a and the sidewall portion 13b form an L-like shape in a cross section. As illustrated in FIGS. 5 and 6, the frame 13 includes through holes 40 in the sidewall portion 13b. The LED units 30 are fitted in the respective through holes 40 from the outer sides such that the LEDs 17 are exposed to the inner sides than the sidewall portion 13b. At least portions of the LED units 30 are placed inside the through holes 40.

The panel holding portion 13a has a horizontally-long rectangular frame-like shape that corresponds to an outer edge portion of the liquid crystal panel 11 (i.e., the non-display area, a frame-like portion). The panel holding portion 13a holds a substantially entire area of the outer portion of the liquid crystal panel 11 from the front side. The long edges of the light guide plate 16 are located outer in the Y-axis direction than the long edges of the liquid crystal panel 11. The panel holding portion 13a has a width that is sufficient to cover not only the outer edge portion of the liquid crystal panel 11 but also the long edges of the light guide plate 16 and LED units 30 from the front side. Similar to the display surface 11c of the liquid crystal panel 11, a front exterior surface of the panel holding portion 13a (an opposed surface from the surface facing the liquid crystal panel 11) is viewable from the front side of the liquid crystal display device 10. The panel holding portion 13a and the display surface 11c of the liquid crystal panel 11 form a front exterior of the liquid crystal display device 10. As illustrated in FIG. 4, panel holding projections 24 are integrally formed with the panel holding portion 13a at the inner edge portions of the panel holding portion 13a. The panel holding projections 24 project toward the rear side, that is, toward the liquid crystal panel 11. Cushioning members 24a are attached to distal end surfaces of the panel holding projections 24. The panel holding projections 24 hold the liquid crystal panel 11 from the front side via the cushioning members 24a. The panel holding projections 24 are provided in long-side portions and short-side portions of the panel holding portion 13a, respectively. Light guide plate holding projections 25 are integrally formed with the panel holding portion 13a at positions inner than the sidewall portion 13b (closer to the light guide plate 16). The light guide plate holding projections 25 project toward the light guide plate 16. The light guide plate holding projections 25 hold the light guide plate 16 from the front side. Cushioning members 25a are attached to surfaces of the light guide plate holding projections 25 opposite the end surfaces of the liquid crustal panel 11 and the optical member 15.

The sidewall portion 13b includes substantially rectangular column portions arranged on the respective sides of the frame 13 that has a frame-like shape. These portions are connected together so as to surround the liquid crystal panel 11, the optical member 15, and the light guide plate 16 held inside the backlight device 12 for the entire peripheries thereof and the chassis 14 on the rear side for the entire periphery thereof as well. The sidewall portion 13b has a rectangular shape in a plan view. A dimension of the sidewall portion 13b measuring in the Z-axis direction is larger than a dimension thereof measuring in the Y-axis direction. The thickness direction of the sidewall portion 13b corresponds to the Y-axis direction. The sidewall portion 13b has a plate-like shape that extends in the Z-axis direction (in the direction in which it extends from the panel holding portion 13a). As illustrated in FIG. 4, the sidewall portion 13b includes the through holes 40 at positions at which the sidewall portion 13b and the light entrance surfaces 16b of the light guide plate 16 overlap.

As illustrated in FIG. 6, each through hole 40 runs through the sidewall portion 13b in an in-and-out direction (the Y-axis direction). The through hole 40 has a rectangular shape that extends in a direction in which the LEDs 17 are arranged in a plan view in the direction in which the through hole 40 runs through (the Y-axis direction). Multiple LEDs 17 are collectively passed through the through hole 40. A dimension of the through hole 40 measuring in the longitudinal direction of the sidewall portion 13b (the X-axis direction) is about equal to a longitudinal dimension of the LED unit 30 (or the heat dissipation plate 19). A dimension of the through hole 40 measuring in the height direction of the sidewall portion 13b (the Z-axis direction) is about equal to the width of the LED unit 30 (or the heat dissipation plate 19). Namely, the through hole 40 has substantially the same shape and size as those of the LED unit 30 (or the heat dissipation plate 19) in a plan view. As illustrated in FIG. 5, a dimension of the through hole 40 measuring in the direction in which the through hole 40 runs through is substantially equal to a sum of the thickness of the LED board 18 and thickness of the heat dissipation plate 19 of the LED unit 30.

As illustrated in FIG. 3, the chassis 14 has a horizontally-long shallow tray-like overall shape and covers substantially entire areas of the light guide plate 16 and the LED units 30 from the rear side. A rear outer surface of the chassis 14 (a surface of the chassis 14 opposite from a surface that faces the light guide plate 16 and the LED units 30) is viewed from the rear side and forms a back exterior of the liquid crystal display device 10. The chassis 14 includes a bottom-plate portion 14*a* and frame mount portions 14*b*. The bottom-plate portion 14*a* has a horizontally-long rectangular shape similar to the light guide plate 16. The frame mount portions 14*b* protrudes from long edges of the bottom-plate portion 14*a* toward the rear side in forms of steps. The frame mount portions 14*b* are mounted to the frame 13. The bottom-plate portion 14*a* has a plate-like shape to hold the most of the middle portion of the short-edge portions of the light guide plate 16 (portions of the short-edge portions except for end portions) from the rear side. Namely, the bottom-plate portion 14*a* is a receiving portion for the light guide plate 16.

As illustrated in FIGS. 3 and 4, each frame mount portion 14*b* is one step back to the rear side than the bottom plate portion 14*a* and in contact with the rear end of the sidewall portion 13*b* (on a side opposite from the panel holding portion 13*a*). A front plate surface of the frame mount portion 14*b* is in surface contact with the rear end surface of the sidewall portion 13*b*. Namely, a configuration for efficiently transmit heat of the frame 13 to the chassis 14 is provided. The chassis 14 and the frame 13 are fixed together with the frame mount portions 14 attached to the respective end portions of the sidewall portion 13*b*. Examples of fixing method include a method using screws. The end portions of the sidewall portion 13*b* may include screw holes that open toward the chassis 14 (not illustrated) and the frame mount portions 14*b* may include insertion holes in which shafts of the screws are inserted (not illustrated). The screws, which are not illustrated, may be inserted into the screw holes from the rear side and screwed.

Next, how the LED units 30 are mounted to the frame 13 will be described. FIG. 5 is a cross-sectional view of a relevant portion of the liquid crystal display device 10. Specifically, FIG. 5 is a magnified cross-sectional view of a portion including one of the LED units 30 and therearound illustrated in FIG. 4. The LED units 30, 30 have the same configuration and they are mounted to the frame 13 in the same manner.

To mount the LED unit 30 to the frame 13, as illustrated in FIG. 6, the LED unit 30 is fitted in the through hole 40 from the outer side. The LED unit 30 is held in a position such that the LEDs 17 face the inner side. The LEDs 17 are passed through the through hole 40. The LED board 18 and the heat dissipation plate 19 are held inside the through hole 40. When the LED unit 30 is fitted in the through hole 40, as illustrated in FIG. 5, the mount surface 18*a* of the LED board 18 on which the LEDs 17 are mounted and an inner surface 13*c* of the sidewall portion 13*b* are arranged on the same plane. Namely, the LEDs 17 project toward the inner side with respect to the inner surface 13*c* of the sidewall portion 13*b*. An outer surface 19*b* of the heat dissipation plate 19 and an outer surface 13*d* of the sidewall portion 13*b* are arranged on the same plane.

A side surface 19*c* of the heat dissipation plate 19 adjacent to the LED mount surface 19*a* is in contact with an inner wall of the through hole 40. With this configuration, heat produced by the LEDs 17 is transmitted to the heat dissipation plate 19 via the LED board 18 and then transmitted from the side surface 19*c* of the heat dissipation plate 19 to the frame 13 via the inner wall of the through hole 40. Furthermore, there is no gap between the side surface 19*c* of the heat dissipation plate 19 and the inner wall of the through hole 40 for an entire periphery thereof. Namely, the through hole 40 is entirely filled with the LED unit 30 (the heat dissipation plate 19).

The LED unit 30 that is fitted in the through hole 40 is mounted to the sidewall portion 13*b*. A known method may be used for mounting the LED unit 30 to the sidewall portion 13*b*, for example, a method using an adhesive layer, welding, or screw mounting. After the LED unit 30 is mounted to the sidewall portion 13*b*, the covering member 33 is mounted from the outer side as illustrated in FIG. 6. This completes the mounting of the LED unit 30 to the frame 13. In an assembly process of the liquid crystal display device 10, the mounting of the LED units 30 to the frame 13 may be performed after the frame 13 and chassis 14 are fixed together or before the frame 13 and chassis 14 are fixed together.

During replacement or reworking of the LED unit 30, the covering member 33 and the LED unit 30 are removed one at a time from the outer side while the frame 13 and the chassis 14 remain fixed together. Then, the LED unit 30 is replaced with a new LED unit 30 or the reworked LED unit 30 according to the mounting steps described above while the frame 13 and the chassis 14 remain fixed together. This completes the replacement or the reworking of the LED unit 30.

As described above, the liquid crystal display device 10 according to this embodiment includes the LED units 30, the liquid crystal panel 11, the light guide plate 16, the chassis 14, and the frame 13. Each LED unit 30 includes the LEDs 17 and the LED board 18 on which the LEDs 17 are mounted. The liquid crystal panel 11 is configured to display images using light from the LEDs 17. The light guide plate 16 is arranged so as to overlap the opposite surface of the liquid crystal panel 11 from the display surface 11*a* and such that the light entrance surfaces 16*b* face the LEDs 17. The chassis 14 is arranged on the opposite side of the light guide plate 16 from the side on which the liquid crystal panel 11 is arranged. The frame 13 is fixed to the chassis 14. The chassis 14 and the frame 13 hold at least the liquid crystal panel 11 and the light guide plate 16 therebetween. The frame 13 includes the panel holding portion 13*a* and the sidewall portion 13*b*. The panel holding portion 13*a* holds the liquid crystal panel 11 from the display surface 11*a* side. The sidewall portion 13*b* continues from the panel holding portion 13*a* and extends on the light entrance surface 16*b* side of the light guide plate 16. The frame 13 includes the through holes 40 that run through the sidewall portion 13*b*. The LED units 30 are fitted in the respective through holes 40 from the outer side such that the LEDs 17 are positioned more to the inner side than the sidewall portion 13*b*. At least portions of the LED units 30 are held inside the respective through holes 40.

According to this embodiment, because the frame 13 includes the through holes 40 in which the LED units 30 are fitted from the outer side such that the LEDs 17 are positioned more to the inner side than the sidewall portion 13*b*, the LED units 30 can be fitted in the through holes 40 while the chassis 14 and the frame 13 remain fixed together. Therefore, during replacement or reworking of the LED unit 30, the LED unit 30 can be removed and mounted while the chassis 14 and the frame 13 remain fixed together. If an LED unit is sandwiched between a frame and a chassis or the LED unit is held between the frame and the chassis, the frame and the chassis need to be separated from each other for removal of the LED unit. The frame may be placed on a bench with its face down and the chassis may be removed from the frame for work. Because the chassis is a large component, the removal of the chassis may reduce workability in the replacement or the reworking of the LED unit. According to this embodiment, removal of the chassis 14 is not required and thus a high level of workability in the replacement or the reworking of the LED unit 30 is achieved.

According to this embodiment, at least portions of the LED units 30 are held inside the through holes 40. In comparison to a configuration in which an LED unit is not held in a sidewall portion, a dimension measuring when the LED units 30 are mounted to the sidewall portion 13b can be reduced. This contributes to a reduction of the frame size of the liquid crystal display device 10.

In this embodiment, the LED boards 18 are held inside the respective through holes 40. This configuration further contributes to the reduction of the frame size of the liquid crystal display device 10 in comparison to a configuration in which the LED boards 18 are not held in the respective through holes 40.

In this embodiment, each LED unit 30 includes the heat dissipation plate 19 arranged on the side of the LED board 18 opposite from the side on which the LEDs 17 are mounted. The LED board 18 and the heat dissipation plate 19 are held inside the through hole 40. With this configuration, the heat is effectively transmitted to the frame 13 via the heat dissipation plates 19 and the heat is transmitted to the chassis 14 via the frame 13. Therefore, the heat produced by the LEDs 17 is efficiently dissipated. Furthermore, the LED boards 18 and the heat dissipation plates 19 are held in the sidewall portion 13b. This configuration further contributes to the reduction of the frame size of the liquid crystal display device 10 in comparison to a configuration in which the LED boards 18 and the heat dissipation plates 19 are not held in the sidewall portion 13b.

In this embodiment, the shape and the size of each through hole 40 in a plan view are the same as those of the corresponding LED unit 30. According to this configuration, the through holes 40 are filled with the respective LED units 30. Therefore, leaks of light through the through holes 40 and entrance of foreign substances through the through holes 40 are less likely to occur.

This embodiment includes the covering members 33 arranged on the sides of the respective LED units 30 opposite from the sides on which the LEDs 17 are mounted and cover the respective LED units 30. According to this configuration, although the frame 13 is a component to form an appearance of the liquid crystal display device 10, it restricts a user from directly touching the LED units 30. Even if temperatures of the LED units 30 become high, a high level of safety is provided.

This embodiment includes light-emitting diodes as light sources. According to this configuration, because the light-emitting diodes have high light directivity, the rays of light from the light-emitting diodes are less likely to travel toward the inner walls of the through holes 40. Therefore, the amounts of light absorbed by the inner walls of the through holes 40 can be reduced.

The display panel in this embodiment is the liquid crystal panel 11 that includes liquid crystals. Such a display device, that is, the liquid crystal display device 10 can be applied to various devices including television devices and displays for personal computers. The liquid crystal display device 10 is especially suitable for large screen applications.

Second Embodiment

Figure 7:
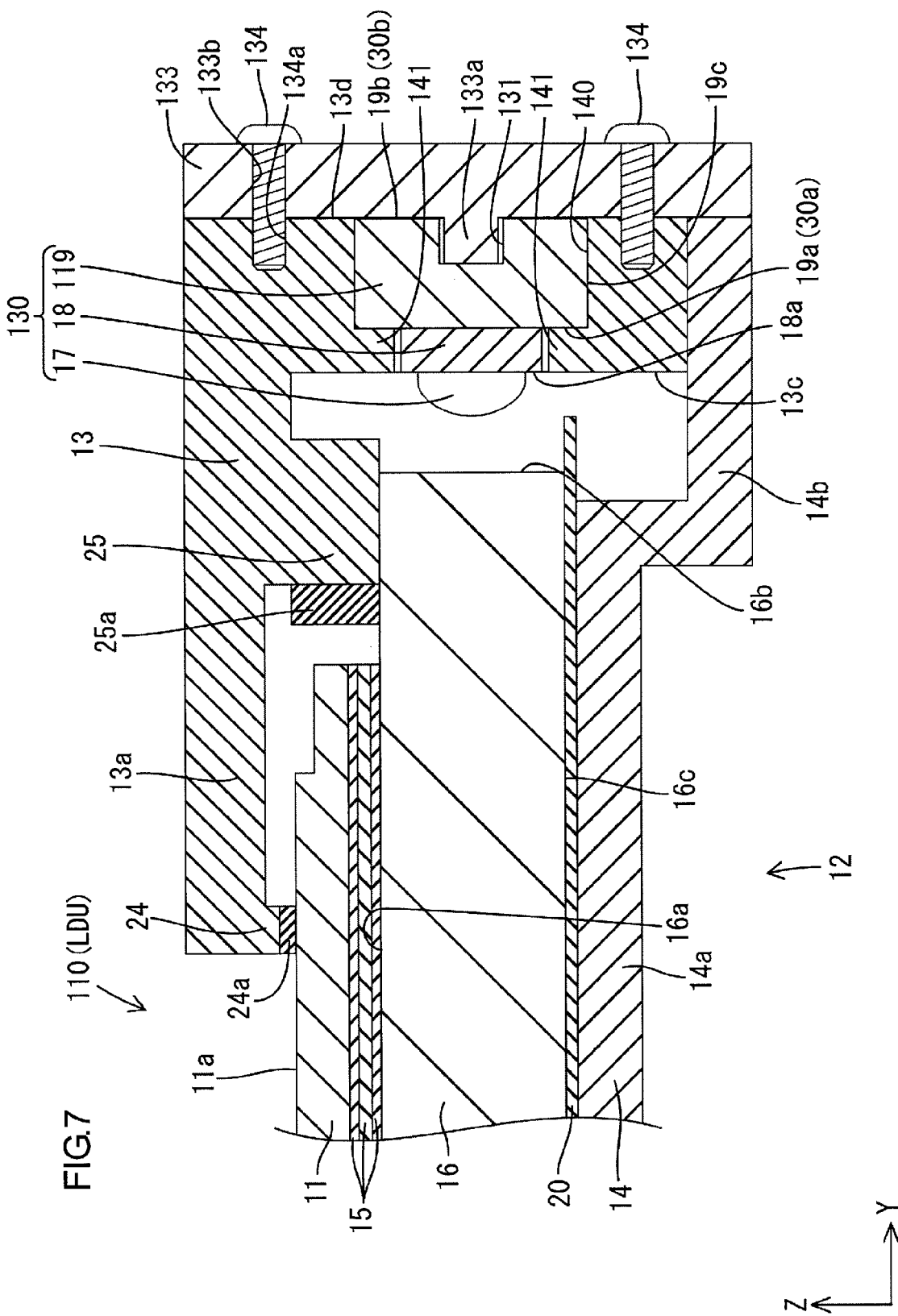
FIG. 7 is a cross-sectional view of a relevant portion of a liquid crystal display device 110.

The second embodiment will be described with reference to the drawings. FIG. 7 is a cross-sectional view of a relevant portion of a liquid crystal display device 110 according to a second embodiment. In the second embodiment, heat dissipation plates 119 are mounted to the sidewall portion 13b in a different manner from the first embodiment. Other configurations are the same as those of the first embodiment. Configurations, functions, and effects similar to the first embodiment will not be described.

Two positioning projections 141, 141 are provided at ends of the Z-axis dimension near inner edge of each through hole 140, respectively. The positioning projections 141, 141 project inward in the through hole 140. The positioning projections 141 are integrally formed with the sidewall portion 13b in forms of ribs that extend from an inner wall of the through hole 140 in an arrangement direction of the LEDs 17. The positioning projections 141, 141 form a narrow-width portion of the through hole 140, a width of which is smaller than a width of other portions of the through hole 140. The LEDs 17 and the LED board 18 can pass between the positioning projections 141, 142; however, the heat dissipation plate 119 cannot pass between the positioning projections 141, 142. Therefore, the LED mount surface 19a of the heat dissipation plate 119 contacts the positioning projections 141 and thus the LED unit 130 is positioned so as not to move further toward the inner side.

Each heat dissipation plate 119 includes multiple recesses 131 in the outer surface 19b. The recesses 131 are arranged at intervals. Covering members 133 include multiple protrusions 133a, respectively. The projections 113a are provided at positions corresponding to the respective recesses 131 and fitted in the respective recesses 131. The protrusions 133a are integrally formed with the covering members 133. The protrusions 133a are made of synthetic resin having thermal conductivity lower than the heat dissipation plates 119.

Each covering member 133 includes through holes 133b and screw holes 134a in the sidewall portion 13b at positions corresponding to the insertion holes 133b. The insertion holes 133b are aligned with the respective screw holes 134a and screws 134 are screwed from the outer side of the covering member 133. As a result, the covering member 133 is fixed to the sidewall portion 13b.

To mount the LED unit 130 to the sidewall portion 13b, the LED unit 130 is first fitted in the through hole 140. Then, the protrusions 133a of the covering member 133 are fitted in the recesses 131 of the heat dissipation plate 119 while the LED unit 130 is positioned with the positioning projections 141. Then, the covering member 133 is mounted to the sidewall portion 13b. As a result, the LED unit 130 is positioned relative to the sidewall portion 13b with respect to an in-and-out direction (the Y-axis direction), the X-axis direction, and the Z-axis direction. The mounting of the LED unit 130 to the sidewall portion 13b is complete.

This embodiment includes the positioning projections 141 in each through hole 140. The positioning projections 141 are configured to contact an inner surface 30a of the LED unit 130 (or the LED mount surface 19a of the heat dissipation plate 119) and to restrict the LED unit 130 from moving to the inner side. With this configuration, positioning of the LED unit 130 fitted in the through hole 140 from the outer side can be easily performed.

This embodiment includes the recesses 131 in the outer surface 30b of each LED unit 130 (or in the outer surface 19b of each heat dissipation plate 119). Each covering member 130 includes the protrusions 133 fitted in the respective recesses 131. The covering members 130 are mounted to the sidewall portion 13b. According to this configuration, by fitting the protrusions 133a of the covering members 133 in the respective recesses 131 of the LED units 130 and mounting the covering members 133 to the sidewall portion 13b, the light source units 130 are mounted to the sidewall portion 13b with the positioning projections 141 and the covering members 133.

Third Embodiment

Figure 8:
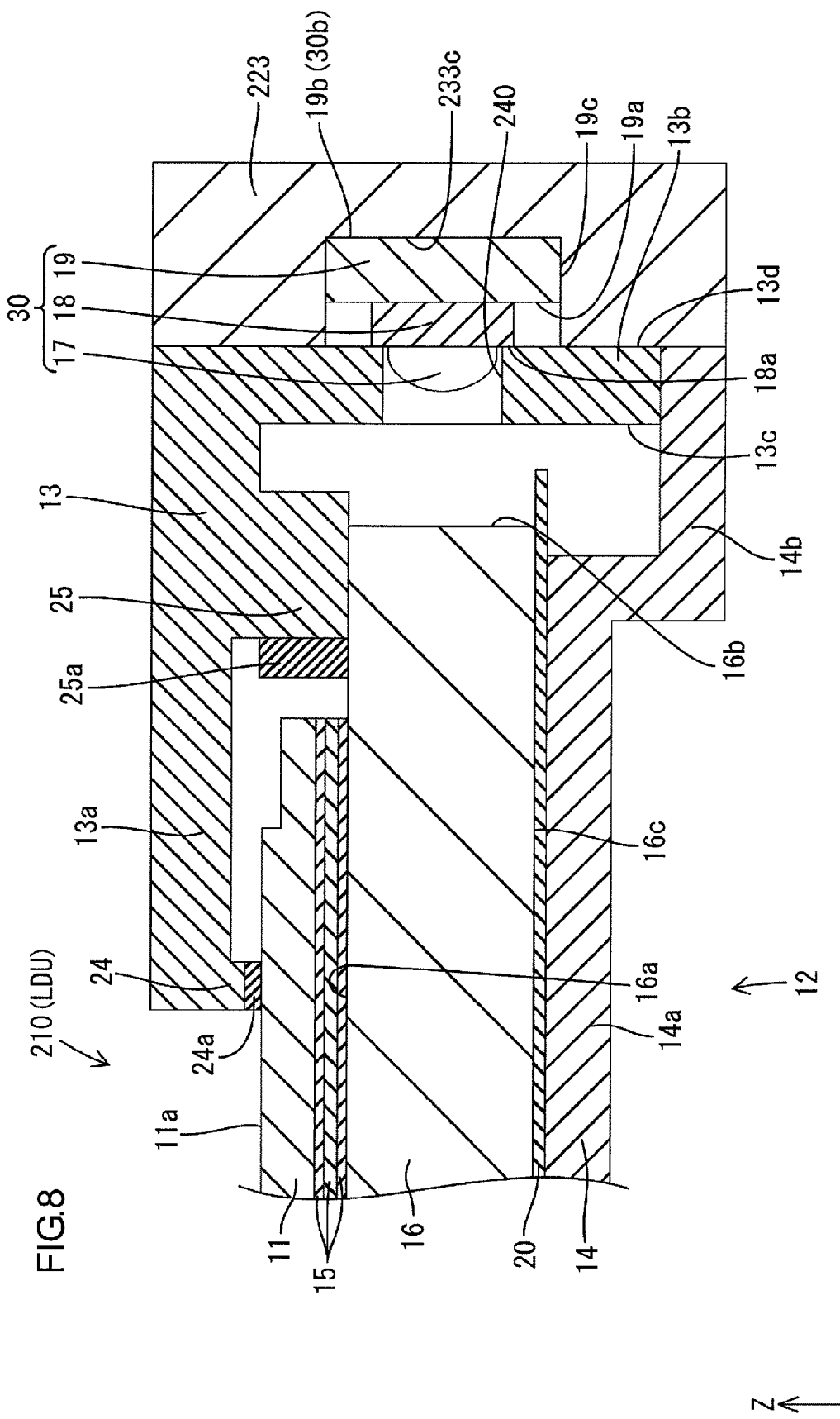
FIG. 8 is a cross-sectional view of a relevant portion of a liquid crystal display device 210.
Figure 9:
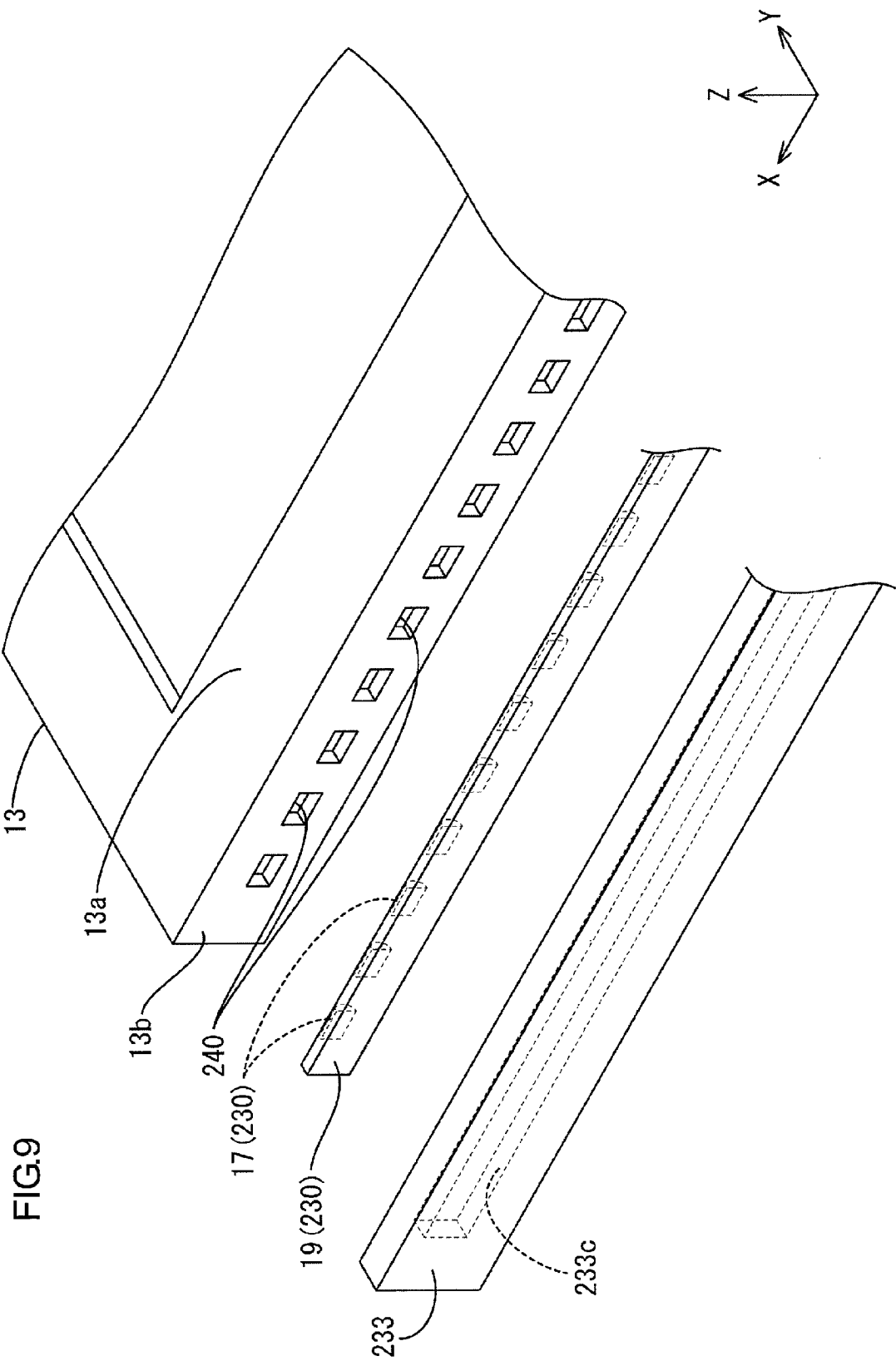
FIG. 9 is a cross-sectional view of a relevant portion of the liquid crystal display device 210 illustrating how to assemble components.

A third embodiment will be described with reference to the drawings. FIG. 8 is a cross-sectional view of a relevant portion of a liquid crystal display device 210 according to a third embodiment. FIG. 9 illustrates how to assemble components of the liquid crystal display device 210. The third embodiment includes through holes 240 having a different configuration from the first embodiment. Other configurations are the same as those of the first embodiment. Configurations, functions, and effects similar to the first embodiment will not be described.

As illustrated in FIG. 8, each through hole 240 runs through the sidewall portion 13b in the in-and-out direction (the Y-axis direction). The through holes 240 are formed in portions that overlap the LEDs 17, respectively, in a plan view in a direction through which the through holes 240 run (the Y-axis direction). Each through hole 240 has a rectangular shape slightly larger than the LED 17. The LEDs 17 are inserted in the through holes 240, respectively.

To mount each LED unit 30 to the frame 13, as illustrated in FIG. 9, the LEDs 17 are fitted in the respective through holes 240 from the outer side. The LEDs 17 are held inside the through holes 240 but the LED board 18 and the heat dissipation plate 19 are not inserted in the through holes 240. The mount surface 18a of the LED board 18 contacts the outer surface of the sidewall portion 13b. The LED unit 30 is arranged such that the outer surface 30b of the LED unit 30 is not flush with the outer surface of the sidewall portion 13b. A covering member 233 is attached from the outer side. The covering member 233 includes a holding recess 233c in the inner surface thereof for holding the heat dissipation plate 19 and the LED board 18. The covering member 233 is attached to the sidewall portion 13b with the heat dissipation plate 19 and the LED board 18 held in the holding recess 233c.

The LED units 30 fitted in the respective through holes 240 are mounted to the sidewall portion 13b. A known method may be used for mounting the LED unit 30 to the sidewall portion 13b, for example, a method using an adhesive layer, welding, or screw mounting. The LED units 30 may be mounted to the sidewall portion 13b via the covering members 233 by attaching the covering members 233 to the sidewall portion 13b.

In this embodiment, multiple LEDs 17 are mounted on each LED board 18, the sidewall portion 13b includes through holes 240 in the portions corresponding to the LEDs 17, and the LEDs 17 are held in the respective through holes 240. According to this configuration, in comparison to a configuration that includes through holes 240 configured to receive the entire LED boards 18, respectively, the sidewall portion 13b has higher strength.

OTHER EMBODIMENTS

The present invention is not limited to the embodiments described above and illustrated by the drawings. For examples, the following embodiments will be included in the technical scope of the present invention.

(1) The first and the second embodiments have the configurations in which the LED boards and the heat dissipation plates are held inside the through holes. However, the configurations may be altered to hold only the LED boards in the through holes.

(2) The first and the second embodiments have the configurations in which the LEDs are not held inside the through holes. However, the configurations may be altered to hold portions of LEDs or entire LEDs in the through holes.

(3) The arrangements, the shapes, and the configurations of the through holes may be altered as appropriate from those of the above embodiments. At least portions of the LED units need to be held inside the through holes. The whole LED units may be held inside the through holes.

(4) In the second embodiment, the positioning projections integrally formed with the sidewall portion form a rib-like shape. However, the arrangements, the shapes, and the configurations of the positioning projections may be altered as appropriate. For example, the positioning projections may not be integrally formed with the sidewall portion or may be arranged at intervals in the arrangement direction of the LEDs. The positioning projection may be formed in a bridge-like shape that extends in the Z-axis direction across edges of the through hole. In this case, the positioning projection may be configured to contact the LEDs arranged adjacent to each other on the LED board.

(5) The arrangements, the shapes, and the configurations of the LED units may be altered as appropriate from those of the above embodiments. For example, the LED units may not include the heat dissipation plates.

(6) In each of the above embodiments, the liquid crystal display device including the liquid crystal panel as the display panel is used. However, the aspect of this invention can be applied to display devices including other types of display panels.

(7) In each of the above embodiments, two LED units (or two LED boards) are arranged opposite the respective long edges of the light guide plate. However, a configuration in which two LED units are arranged opposite the respective short edges of the light guide plate is included in the aspect of the present invention.

(8) Other than the above embodiment (7), a configuration in which four LED units (or four LED units) are arranged opposite the respective long edges and the respective short edges of the light guide plate is included in the aspect of the present invention. A configuration in which only one LED unit is arranged opposite the long edge or the short edge of the light guide plate is included in the scope of the present invention. Furthermore, a configuration in which three LED units are arranged opposite any of three edges of the light guide plate, respectively, is included in the aspect of the present invention.

(9) In each of the above embodiments, one LED unit (or one LED board) is arranged for one edge of the light guide plate. However, two or more LED units may be arranged for one edge of the light guide plate. In this case, two or more through holes may be provided for one edge of the light guide plate corresponding to the LED units.

(10) In each of the above embodiments, the LEDs are used as light sources. However, other types of light sources including organic ELs may be used.

The embodiments have been described in detail. However, the above embodiments are only some examples and do not limit the scope of the claimed invention. The technical scope of the claimed invention includes various modifications of the above embodiments.

EXPLANATION OF SYMBOLS

TV: television device, LDU: liquid crystal display unit, PWB: power board, MB: main board, CTB: control board, CV: cover, ST: stand, 10, 110, 210: liquid crystal display device (display device), 11: liquid crystal panel (display panel), 11a: display surface, 12: backlight device, 13: frame (frame member), 13a: panel holding portion, 13b: sidewall portion, 14: chassis, 15: optical member (optical sheet), 16: light guide plate, 16a: light exit surface, 16b: light entrance surface (end surface), 17: LED (light source), 18: LED board (light source board), 19, 119: heat dissipation plate, 20: reflection sheet, 30, 130: LED unit (light source unit), 30a: inner surface, 30b: outer surface, 33, 133, 233: covering member, 40, 140, 240: through hole, 131: recess, 133a: protrusion, 141: positioning projection.

The invention claimed is:

1. A display device comprising:
   a light source;
   a light source unit including a light source board on which the light source is mounted;
   a display panel configured to display images using light from the light source;
   a light guide plate arranged on an opposite side of the display panel from a display surface so as to overlap the display panel and having an end surface arranged opposite the light source;
   a chassis arranged on an opposite side of the light guide plate from the display panel; and
   a frame member fixed to the chassis and holding at least the display panel and the light guide plate between the frame member and the chassis, the frame member including a panel holding portion and a sidewall portion, the panel holding portion holding the display panel from a display surface side, the sidewall portion continuing from the panel holding portion and extending on an end surface side of the light guide plate, the sidewall portion including a through hole that runs through the sidewall portion and in which the light source unit is fitted from an outer side such that the light source is positioned more to an inner side than the sidewall portion and at least a portion of the light source unit is held inside the through hole.

2. The display device according to claim 1, wherein the light source board is held inside the through hole.

3. The display device according to claim 1, wherein the light source unit includes a heat dissipation plate arranged on an opposite surface of the light source board from a surface on which the light source is mounted, and
   the light source board and the heat dissipation plate are held inside the through hole.

4. The display device according to claim 1, wherein the through hole has a shape and a size substantially the same as those of the light source unit in a plan view.

5. The display device according to claim 1, further comprising a covering member arranged on an opposite side of the light source unit from the surface on which the light source is mounted and covering the light source unit.

6. The display device according to claim 1, wherein a positioning projection is provided in the through hole, the positioning projection being configured to contact an inner surface of the light source unit and to restrict the light source unit from moving to the inner side.

7. The display device according to claim 5, wherein the light source unit includes a recess in an outer surface of the light source unit, and
   the covering member includes a protrusion fitted in the recess and is attached to the sidewall portion.

8. The display device according to claim 1, wherein a plurality of light sources are mounted on the light source board,
   the sidewall portion includes the through hole in a portion that overlaps the light sources, and
   the light sources are held inside the through hole.

9. The display device according to claim 1, wherein the light source is a light emitting diode.

10. The display device according to claim 1, wherein the display panel is a liquid crystal panel including liquid crystals.

11. A television device comprising the display device according to claim 1.

* * * * *